United States Patent [19]

Ankele

[11] Patent Number: 5,075,611
[45] Date of Patent: Dec. 24, 1991

[54] SINGLE PHASE AC MOTOR CONTROL DEVICE

[75] Inventor: Thomas M. Ankele, Nuertingen, Fed. Rep. of Germany

[73] Assignee: Torotron Elektronik GmbH, Fed. Rep. of Germany

[21] Appl. No.: 466,453
[22] PCT Filed: Sep. 27, 1989
[86] PCT No.: PCT/EP89/01132
 § 371 Date: May 22, 1990
 § 102(e) Date: May 22, 1990
[87] PCT Pub. No.: WO90/03689
 PCT Pub. Date: Apr. 5, 1990

[30] Foreign Application Priority Data

Sep. 29, 1988 [DE] Fed. Rep. of Germany ....... 3833016

[51] Int. Cl.$^5$ .................... H02P 3/20; H02P 9/06
[52] U.S. Cl. .................... 318/754; 318/756; 318/777; 318/775; 318/749
[58] Field of Search .............. 318/754, 751, 755, 626, 318/756, 774, 257, 775, 727, 777, 749

[56] References Cited

U.S. PATENT DOCUMENTS

| | | | |
|---|---|---|---|
| 3,619,747 | 11/1971 | Pedersen | 318/202 |
| 3,896,355 | 7/1975 | Guicheteau | 318/207 |
| 4,087,728 | 5/1978 | Porter | 318/626 |
| 4,413,211 | 11/1983 | Fowler | 318/257 |
| 4,451,775 | 5/1984 | Phillips et al. | 318/795 |
| 4,649,330 | 3/1987 | Kim | 318/756 |

Primary Examiner—William M. Shoop, Jr.
Assistant Examiner—John W. Cabeca
Attorney, Agent, or Firm—Barry R. Lipsitz

[57] ABSTRACT

A control device is provided for an alternating current motor operating in single phase and having first and second windings coupled so that they are shifted in phase with respect to each other. A control unit includes first and second switching elements located between a line connection and respective first and second windings of the motor. One of the switching elements is open and the other closed in a switching state of the control unit, depending on the running direction of the motor. At least one of the switching elements is open when the control unit is in a state of rest. A power supply unit is provided for providing electric energy to the control unit. When the control unit is in a state of rest, the power supply operates by drawing on a first potential difference between a line connection and winding connection associated with the switching element that is open in the state of rest. When the control unit is in its switching state, the power supply draws on a second potential difference between the line connection and the winding connection associated with the switching element that is open in said switching state.

17 Claims, 6 Drawing Sheets

SINGLE PHASE AC MOTOR CONTROL DEVICE

BACKGROUND OF THE INVENTION

The invention relates to a control device for an alternating-current motor operating in single-phase and having at least a first and a second winding, one coupled with the other such that they are shifted in phase with respect to each other, comprising a line connection, a first and a second winding connection for the first and the second winding, respectively, of the alternating-current motor, a control unit including a first and a second switching element located between the line connection and the first and the second winding connection, respectively, one of the switching elements being open in a switching state of the control unit, depending on the running direction of the alternating-current motor, and the other being closed, and at least one of the switching elements being open in a state of rest of the control unit, and a power supply unit for making electric energy available for the control unit.

In the control devices known so far, it has always been necessary for the power supply unit to have both the phase and the neutral conductor leading to the control device in order that the power supply unit is capable of constantly supplying the control unit with the necessary electric energy. If such a control device is to replace an electromechanical switch which is already available and which only switches, for example, the phase onto one of the winding connections of the electric motor, there is the problem that in addition to the line for the phase and the lines for the two winding connections, the neutral conductor has to be linked up in order to ensure that this control device is constantly supplied with power independently of operation of the alternating-current motor. Problems arise particularly when this is to be carried out within the scope of a home installation, more particularly, using an available socket installed when the building was constructed.

SUMMARY OF THE INVENTION

The object underlying the invention is, therefore, to so improve a control device of the generic kind that operation thereof is possible without linking up an additional neutral conductor to the control device.

This object is accomplished in accordance with the invention with a control device of the kind described at the beginning in that the power supply unit operates in the state of rest of the control unit by drawing on a first potential difference between the line connection and a winding connection associated with the switching element open in the state of rest and in the switching state of the control unit by drawing on a second potential difference between the line connection and the winding connection associated with the switching element open in the switching state.

Hence the gist of the invention is to be seen in that in the state of rest, the full voltage present at one of the switching elements is drawn on for operation of the power supply unit, with the control device getting the minimal electric energy required for operating it, on the one hand, via the line connection and, on the other hand, via the alternating-current motor from the neutral conductor. In the switching state of the control unit, on the other hand, the voltage drop between the first and the second winding connections is drawn on, this corresponding to the phase shift between the two windings for generation of a rotating field required for running of the motor. Since, in the switching state, the control unit connects a winding connection with the line connection, the voltage between the line connection and the winding connection associated with the open switching element is, consequently, drawn on. As the shift in phase between the two windings is brought about by, for example, a motor capacitor, the voltage applied in this case to the power supply unit corresponds to the voltage drop across this motor capacitor during operation of the alternating-current motor.

Since the control devices according to the invention serve, for example, to control alternating-current motors used to operate roller-type shutters, sunblinds or the like, and are, therefore, switched off in each running direction by limit switches, it is expedient within the scope of the present invention, in the state of rest of the control unit, for the first potential difference between the line connection and the winding connection associated with the switching element open during the previous switching state to be drawn on. Hence it is always ensured even with an alternating-current motor with limit switches that in the state of rest a current can flow from the power supply unit via the alternating-current motor to the respective other conductor and this is not interrupted by some switch-off device.

A flow of current in the state of rest can, however, be ensured in a particularly advantageous way by the first potential difference between the line connection and both the first and the second winding connections being drawn on so that when a limit switch is actuated, the necessary current can always flow via the other limit switch which is still closed and there is no necessity to tap the first potential difference in the state of rest in accordance with the previous switching state.

A particularly simple solution makes provision for the power supply unit to be connected by a first power supply connection to the line connection and by at least one second power supply connection to the winding connection selected in accordance with the switching state or state of rest. The interposition of current-limiting components, if appropriate, is also to be understood by the term "connected".

One possibility of establishing the necessary connection between the power supply connection and the respective winding connection consists in the second power supply connection being connected, in the state of rest and in the switching state, with the selected winding connection by at least one switchover element activated in accordance with the running direction of the alternating-current motor.

In principle, such a switchover element may be provided in addition to the two switching elements. However, in order to design the inventive control unit as simply as possible, provision is made for at least one of the switching elements to be designed as switchover element and to connect the winding connection associated therewith either with the line connection or with the second power supply connection. It is particularly advantageous for both switching elements to be designed as such switchover elements.

As a further preferred alternative to the above-described inventive provision of a switchover element, there is also the possibility of the second power supply connection being connected with each winding connection via one alternating-current resistor, respectively. Quite generally, each current-limiting component or each current-limiting assembly is to be understood by an alternating-current resistor. In this embodiment, switchover of the second power supply connection to the various winding connections is no longer necessary at all, but instead depending on whether the switching elements are in their state of rest or in the switching state, the first or second potential difference is respectively applied to the power supply unit. If both switching elements are open, there is a connection with both winding connections via both alternating-current resistors and so the necessary current can flow via at least one winding connection respectively from the second power supply connection to the neutral conductor. If, on the other hand, in the switching state, one switching element is closed, then both alternating-current resistors act as voltage dividers with the power supply connection located at their center tap. The voltage divider now lies between the two winding connections, with the voltage difference owing to the shift in phase between the windings of the alternating-current motor being present between both winding connections, as described at the beginning, and hence, depending on the design of the alternating-current resistors, a fraction of this voltage difference, in the case of identical alternating-current resistors, half of this voltage difference, being present between the first and the second power supply connections.

Within the scope of the present invention, the alternating-current resistors may comprise ohmic resistors. However, in order to keep the developing heat as low as possible, it is advantageous for the alternating-current resistors to comprise capacitors.

To supply the control unit with current free of potential, it is, however, advantageous for a primary winding of a transformer to be located between the first and second power supply connections and for a secondary winding thereof to be used to make the electric energy available for the control unit.

In this case, the control unit as a whole is free of potential and so, in particular, it complies with the safety regulations for external operation.

In all known embodiments, it is necessary for the power supply to comprise a rectifier. This rectifier may be connected directly between the first and second power supply connections of the power supply unit.

Since use of a rectifier is necessary in all variants described so far, this preferably being a bridge rectifier comprised of diodes, provision is made in a further embodiment in which, in particular, use of a minimum number of components is desired, in order to make it as compact as possible, for the second power supply connection to be connected with each winding connection via one diode respectively and for the diodes to be poled in the same direction. As far as the basic principle is concerned, this embodiment is similar to the embodiment in which the two alternating-current resistors form a voltage divider, but with the difference that instead of the alternating-current resistors, the two diodes arranged in the forward direction are now used.

In a further preferred alternative design of the inventive solution, provision is made for the power supply unit to comprise two second power supply connections which are each connected with a winding connection, for one primary winding of a transformer to be located between the line connection and each power supply connection, respectively, and for a second winding of each transformer to be coupled with the respective other one.

Hence with this implementation of the inventive idea, one primary winding is constantly located between the winding connection and the line connection and so there can flow, in the state of rest of the control unit, at least via one of these primary windings a current from the line connection via the alternating-current motor to the neutral conductor. In the switching state of the control unit, no current flows via the primary winding that is connected to the winding connection associated with the closed switching element, as there is no voltage difference at this primary winding, whereas current flows through the other primary winding at which the voltage difference due to the shift in phase between the windings is present and so this can be used to couple out the necessary electric energy.

With this solution, the control unit can be supplied with current free of potential, in particular, in a simple manner.

Since rectification also has to be carried out, provision is preferably made for each secondary winding to be connected with an input of one rectifier, respectively, and for the outputs of the rectifiers to be connected in parallel.

In all embodiments of the inventive solution described so far, there is the problem with all alternating-current motors with a switch-off device for end positions that when this alternating-current motor is to run out of this end position, this switch-off device first keeps the connection with the winding connection interrupted for a short time so that in the switching state the second potential difference is not available for a short time as it is only present at the winding connections when the corresponding switch-off device is no longer actuated and hence closed. On actuating the control device, the alternating-current motor would only start up for a short time as the supply of power for the control unit would then break down and would, therefore, no longer be capable of activating the switching elements. For this reason, it is expedient for the power supply unit to comprise an electric energy storage means, for example, an accumulator. In the simplest case, this may be a capacitor as the latter can be so dimensioned that it keeps the required energy ready to supply the control unit for the short time necessary.

In all embodiments known so far, it has not been specified in detail how the switching elements are to be designed. The simplest, preferred, conventional possibility of implementing these, which also offers advantages with respect to operational safety, is for the switching elements to comprise a relay. The only disadvantage of these relays is a relatively high current intake in the switched state.

For this reason, in particular in an embodiment in which the current intake of the control unit is to be as low as possible, provision is made for the switching elements to comprise triacs which, for example, only have to be fired for a certain time after the alternating voltage passes through zero.

Owing to their advantages, all of the inventive solutions mentioned hereinabove can be installed in conventional sockets made available at the time of construction of the building.

BRIEF DESCRIPTION OF THE DRAWING

Further features and advantages of the inventive solution are the subject of the following description and the drawings of several embodiments. The drawings show.

DETAILED DESCRIPTION OF THE INVENTION

Figure 1:
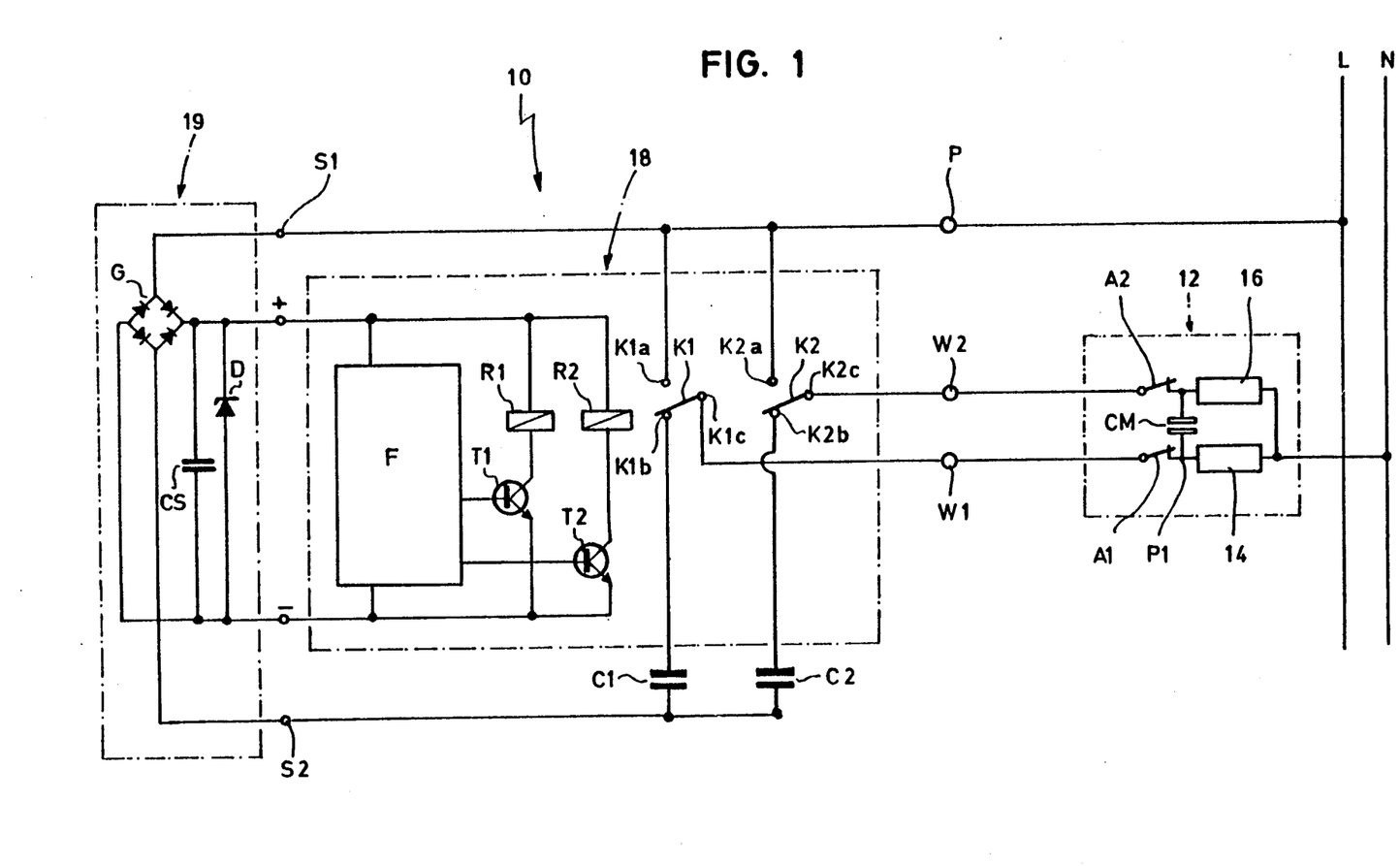
FIG. 1 a schematic diagram of a first embodiment of the invention in which capacitors are provided to limit current flow through the power supply.

A first embodiment, designated in its entirety 10, of an inventive control device, illustrated in FIG. 1, comprises a phase connection P which is connectable to a phase L of a conventional alternating-current line. The control device 10 further comprises a first winding connection W1 and a second winding connection W2. An alternating-current motor, designated in its entirety 12, is connected to both the first winding connection W1 and the second winding connection W2. The alternating-current motor 12 is, in turn, also connected to a neutral conductor N of the conventional alternating-current line mentioned hereinabove. This alternating-current motor 12 comprises a first winding 14 and a second winding 16 which on the neutral conductor side are jointly connected to the neutral conductor N of the alternating-current line mentioned hereinabove and on the phase side are connected with the first winding connection W1 and the second winding connection W2, respectively. A coupling is also provided on the phase side between the two windings 14, 16, this being implemented via a motor capacitor CM. The alternating-current motor 12 is operated in such a way that either the first winding connection W1 or the second winding connection W2 is connected with the phase connection P by the control device 10. Therefore, the respective first winding 14 or second winding 16 is directly connected with the phase connection P while the respective other winding, i.e., the second winding 16 or the first winding 14 is connected via the motor capacitor CM with the phase connection P. This produces a shift in phase with respect to the first or second winding 14 or 16 that is directly connected with the phase connection and hence generates the rotating field of the first winding 14 shifted in phase with respect to the second winding 16, which is required at least for start-up of the alternating-current motor 12.

Hence the alternating-current motor 12 can be operated in one running direction by connection of the first winding connection W1 with the phase connection P, and reversal of the running direction can be brought about by the phase connection P being switched over by the control device 10 from the first winding connection W1 to the second winding connection W2.

If the alternating-current motor 12 is to be used to drive certain devices such as, for example, roller-type shutters, sunblinds or the like, there is additionally provided between the first winding connection W1 and the branch-off to the motor capacitor CM a first switch-off device A1 for the power supply to the windings 14 and 16 and between the second winding connection W2 and the branch-off to the motor capacitor CM a second switch-off device A2 for interruption of the power supply to the windings 16, 14. These two switch-off devices A1 and A2 are associated with end positions of the devices to be operated by the alternating-current motor 12 and are adjustable so as to be opened by the respective device when the respective end position is reached.

In such a case, the alternating-current motor 12 operates in such a way that when the first winding connection W1 is connected with the phase connection P, the windings 14 and 16 are supplied with power until the device has reached its end position and interrupts the power supply to the windings 14 and 16 by actuation of the first switch-off device A1. Hence the motor 12 can rotate no further in this direction. Only after the phase connection P has been switched over from the first winding connection W1 to the second winding connection W2 can the alternating-current motor 12 start up in the opposite direction, in which case the respective device moves away from its end position and hence closes the first switch A1 again. This goes on until the device has reached its other end position and opens the second switch-off device A2, thereby bringing the alternating-current motor 12 to a stop.

To establish a connection between the phase connection P and the first winding connection W1 or the second winding connection W2, the first embodiment of the inventive control device comprises a control unit 18. A relay R1 with a driver T1 and a relay R2 with a driver T2 are connected in series between a positive supply voltage + and a negative supply voltage − in this control unit 18. The drivers T1 and T2 are activated by an electric function control means F likewise located between the postive supply voltage + and the negative supply voltage −. The function control means F ensures that either driver T1 or driver T2 is conductive and hence switches relay R1 or relay R2. The function control means F may be given a command for one of drivers T1 or T2 to be made conductive by manual operation or by, for example, an automatic time switching device which specifies a function at certain times.

Belonging to relay R1 is a contact K1 which switches back and forth with a contact base K1c between the two contact points K1a and K1b so the contact base K1c is connected to either contact point K1a or contact point K1b. In the state of rest, the contact base K1c rests against the contact point K1b. The contact K1 is switched such that contact point K1a leads to the phase connection P while contact point K1b communicates with a capacitor C1. The contact base K1c, for its part, is directly connected with the first winding connection W1.

The contact K2 belonging to relay R2 is designed in the same way as contact K1, i.e., a contact point K2a leads to the phase connection P, a contact point K2b communicates with a capacitor C2 and a contact base K2c is directly connected to the second winding connection W2.

In a state of rest of the control unit 18, contacts K1 and K2 establish a connection between contact point K1b and contact base K1c as well as between contact point K2b and contact base K2c, whereas in a switching state of the control unit 18 either contact K1 or contact K2 connects contact base K1c with contact point K1a or contact base K2c with contact point K2a and hence connects either the first winding connection W1 or the second winding connection W2 to the phase connection P.

A power supply unit 19 comprising a first power supply connection S1 and a second power supply connection S2 is provided for supplying the control unit 18 with the necessary supply voltage +, −. The first power supply connection S1 is directly connected to the phase connection P, while the second power supply connection S2 communicates via capacitors C1 and C2 with contact points K1b and K2b.

A bridge rectifier G which delivers the positive and negative supply voltage +, − on the output side thereof is located between the first power supply connection S1 and the second power supply connection S2 of the power supply unit 19. Also provided in the power supply unit is a capacitor CS which is located between the positive and the negative supply voltages and serves as electric energy storage means to compensate brief interruptions in the power supply to the power supply unit 19 via the first supply connection S1 and the second power supply connection S2 and to maintain the positive and the negative supply voltage +, − during this time.

The power supply for the power supply unit 19 of the control device 10 is ensured in the following way:

In the state of rest of the control unit 18, contact K1 establishes a connection between the first winding connection W1 and the second power supply connection via capacitor C1, while at the same time contact K2 establishes a connection between the second winding connection W2 and the second power supply connection S2 via capacitor C2. In addition, the first power supply connection S1 is permanently connected to the phase connection P.

A situation is assumed where the alternating-current motor 12 has driven the described device into an end position in which this device actuates the first switch-off device A1 and so the latter has cut off the connection between the first winding connection W1 and the windings 14, 16. In this case, it is, however, simultaneously ensured that the second switch-off device A2 is not actuated so the second power supply connection S2 is connected to the neutral conductor N via the capacitor C2, the second winding connection W2, the second winding 16 and parallel thereto the motor capacitor CM and the first winding 14.

Hence the power supply unit 19 can draw via the phase connection P and via the first power supply connection S1 on a current which flows via the second power supply connection S2, the capacitor C2, the contact K2, the second winding connection W2, the second switch-off device A2, the second winding 16 and parallel thereto the motor capacitor CM and the first winding 14 to the neutral conductor N.

Consequently, in this end position and in the state of rest of the control unit 18, it is ensured that the power supply unit 19 is supplied.

When the first switch-off device A1 is actuated, startup of the alternating-current motor 12 is only possible when the control unit 18 connects the second winding connection W2 with the phase connection P by actuating contact K2. In this switching state of the control unit 18, the contact base K2c is no longer connected with the contact point K2b, but with the contact point K2a so the described connection with the neutral conductor N is interrupted. However, once the second winding connection W2 is connected with the phase connection P by contact K2, the alternating-current motor 12 starts up and so the respective device leaves its end position and the first switch-off device A1 is no longer actuated and can, therefore, close.

In this switching state of the control unit, i.e., when the contact base K2c rests against the contact point K2a, and the first switch-off device A1 is no longer actuated, the second power supply connection S2 of the power supply unit 19 is connected via the capacitor C1, the contact K1, the first winding connection W1 and the first switch-off device A1 with potential P1 which forms between the winding connections W1 and W2 while the alternating-current motor 12 is running. Hence owing to the connection of the first power supply connection S1 with the phase connection P, the power supply unit 19 is connected with its first power supply connection S1 and its second power supply connection S2 to a potential difference between the phase connection P and the potential P1, reduced at the voltage drop across C1. This potential difference is sufficient to generate the necessary positive and negative supply voltages for the control unit 18, in particular for operating relay R2.

Only in the first start-up phase of the alternating-current motor 12, i.e., immediately after switchover of the contact base K2c from contact point K2b to contact point K2a, is there a time interval in which the second power supply connection S2 is not connected to the potential P1 because the device has not yet moved far enough away from its end position and is still operating the first switch-off device A1 which interrupts a connection between the second power supply connection S2 and the potential P1. This time interval is, however, only of the order of magnitude of milliseconds. For this purpose, the power supply unit 19 is provided with capacitor CS which discharges during this short time and hence maintains the positive and negative supply voltage +, − during this short time until the first switch-off device A1 closes. In a similar way, it is ensured that the inventive control device 10 is supplied with power when the alternating-current motor has moved the device towards the other end position so the second switch-off device is open.

Since the power supply unit 19, therefore, operates with different voltages, depending on whether the control unit 18 is in the state of rest or in the switching state, a Zener diode D is additionally provided between the positive and the negative supply voltage for voltage stabilization.

In the first described embodiment of the control device 10, capacitors C1 and C2 serve to limit the flow of current through the power supply unit 19.

Figure 2:
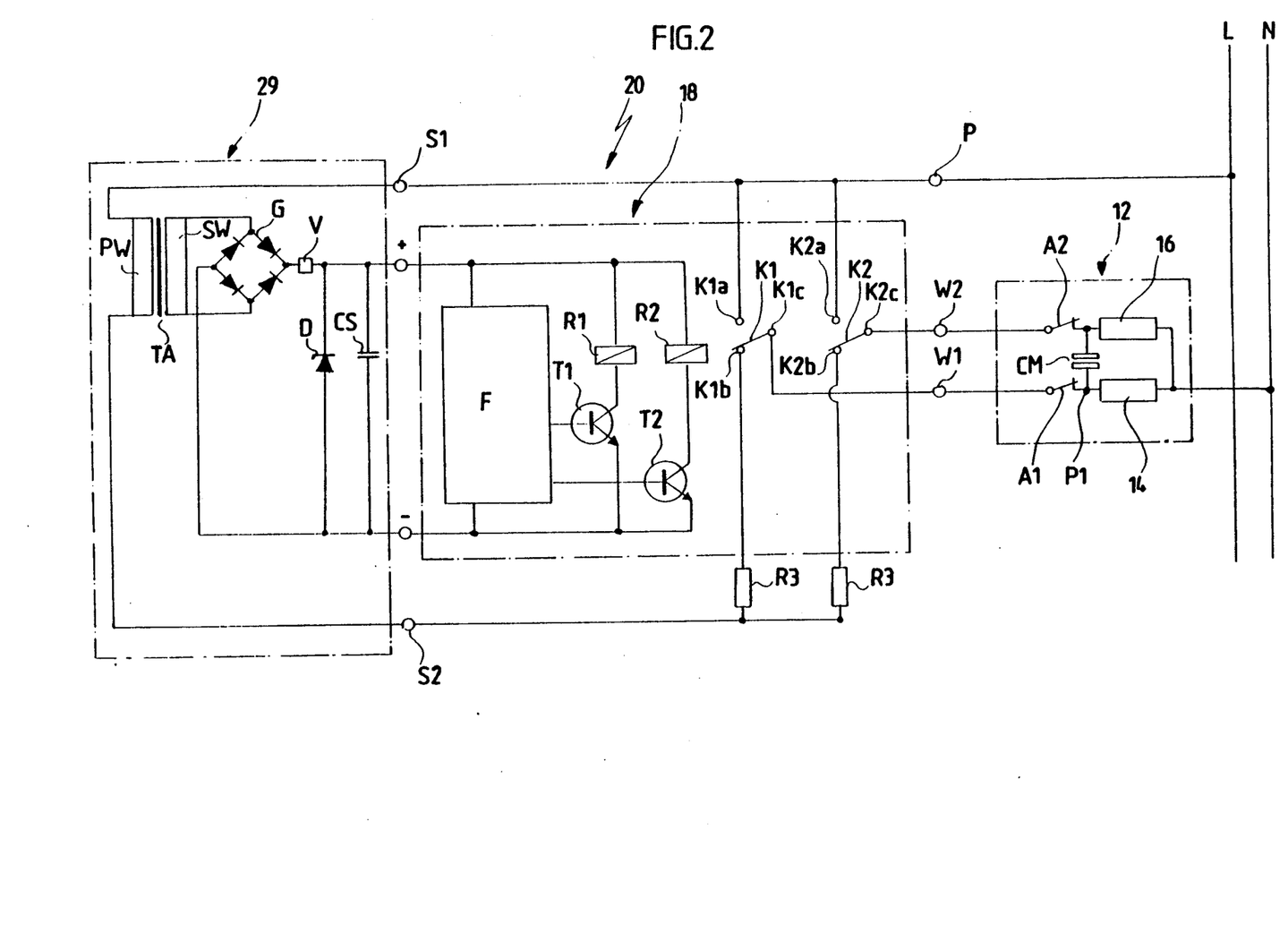
FIG. 2 a schematic diagram of a second embodiment of the invention in which a transformer operated power supply is provided.

In a second embodiment, designated in its entirety 20, of the inventive control device, illustrated in FIG. 2, parts identical with those of the first embodiment bear the same reference numerals. Therefore, for a description of these, reference is to be had to the first embodiment.

In contrast with the first embodiment, a power supply unit 29 comprises a transformer TA located with a primary winding PW between the power supply connections S1 and S2 and operating with a secondary winding SW the rectifier G which, in turn, generates the positive and negative supply voltage +, −.

The advantage of the transformer TA is to be seen in the fact that the control unit 18 is now supplied with current free of potential and hence corresponds to all existing safety regulations. Furthermore, owing to the current transfer ratio of the transformer TA substantially lower currents flow on the primary side and so large voltage drops do not occur across the resistors R3 even if these are of high-resistive design.

Stabilization of the supply voltage +, − is carried out via a series resistor V following the rectifier G and via the Zener diode D as well as the capacitor CS which, as in the power supply unit 19, is located between the positive and the negative supply voltages.

Capacitors C1 and C2 are replaced by ohmic resistors $R_3$ which serve when neither the first switch-off device A1 nor the second switch-off device A2 is actuated and the control unit 18 switches from the switching state to the state of rest, to prevent sudden discharge of the motor capacitor CM and hence spark formation when the contact K1 or K2 switches back into the state of rest.

Otherwise, the second embodiment functions in exactly the same way as the first embodiment.

Figure 3:
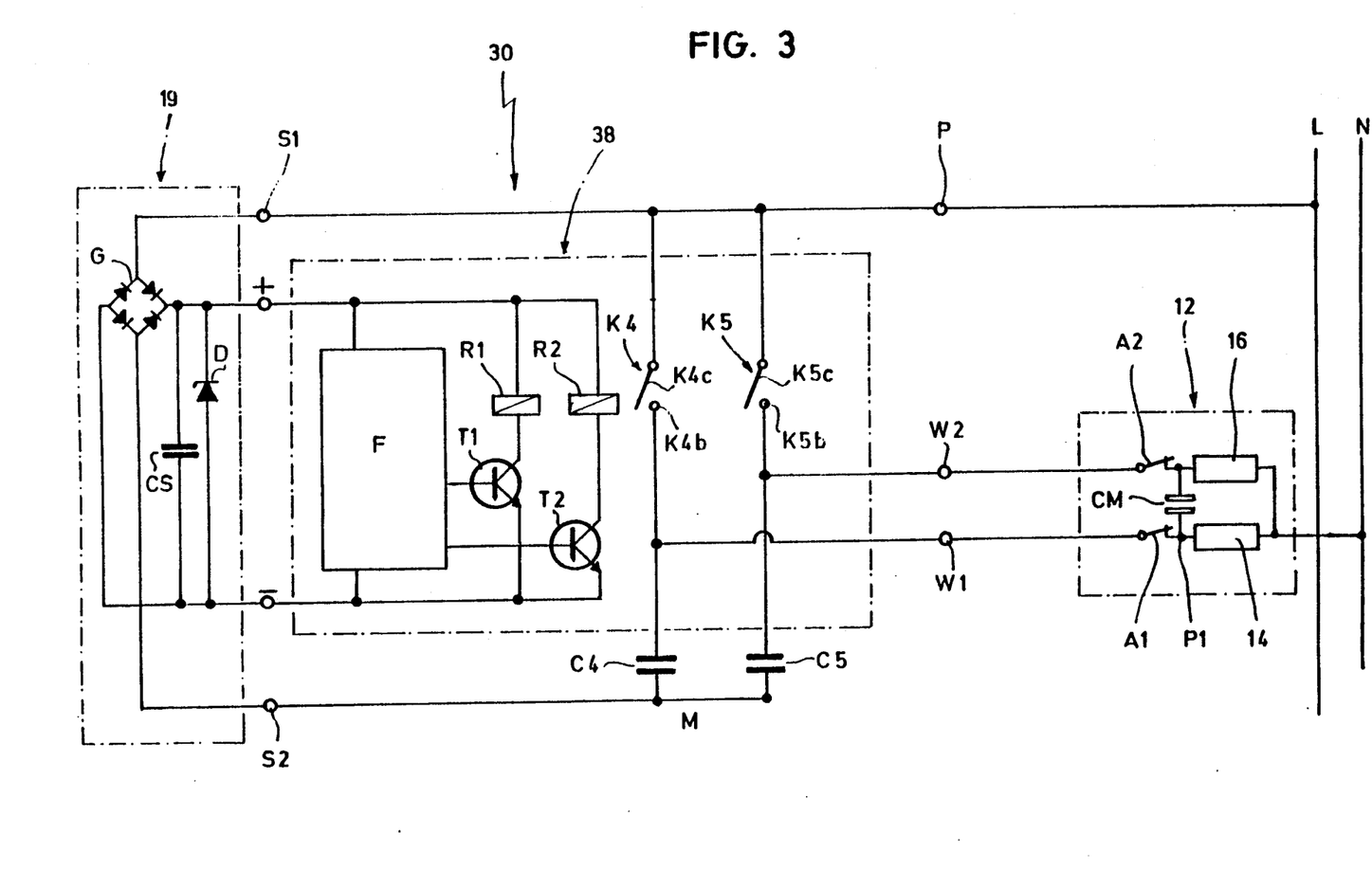
FIG. 3 a schematic diagram of a third embodiment of the invention similar to the first embodiment but utilizing single pole relays in the control circuit.

In a third embodiment, designated in its entirety 30, of the inventive control device, illustrated in FIG. 3, parts identical with those of the first embodiment bear the same reference numerals. Therefore, for a description of these reference is to be had to the statements on the first embodiment.

In contrast with the first embodiment, the two relays R1 and R2 have differently designed contacts K4 and K5. These contacts K4, K5 are merely on/off switches and so a contact base K4c is merely connectable with a contact point K4b or not. Similarly, a contact base K5c is connectable with a contact point K5b or not.

The contact point K4b is connected via a capacitor C4 with the second power supply connection S2 and the contact K5b via a capacitor C5 with the power supply connection S2. Between contact point K4b and capacitor C4, a line branches off to the first winding connection W1 and between contact point K5b and capacitor C5 a line to the second winding connection W2.

The contact bases K4c and K5c of contacts K4 and K5 are both directly connected with the phase connection P.

The power supply unit 19 of the third embodiment 30 is identical with that of the first embodiment 10.

The third embodiment 30 of the inventive control unit functions in such a way that in the state of rest of the control unit 38, the contacts K4 and K5 are open, i.e., do not establish a connection between the contact bases K4c and K5c and the contact points K4b and K5b, respectively.

Since the power supply connection S2 is constantly connected with the first winding connection W1 via the capacitor C4 and constantly with the second winding connection W2 via the capacitor C5, current can flow from the second power supply connection S2 to the neutral conductor via the alternating-current motor 12, exactly as in the first embodiment, even if one of the switch-off devices is A1 or A2 is actuated.

If, assuming that the first switch-off device A1 is actuated, the control unit 38 now goes into the switching state, i.e., the contact K5 closes, then the second winding connection W2 is directly connected with the phase connection P. In this case, the motor starts up and after a short time will have moved the device to be operated so far that the first switch-off device A1 is no longer actuated and hence closes. In this state, the potential P1 forms again while the alternating-current motor 12 is running and so the first winding connection W1 is connected to potential P1, while the second winding connection W2 is connected to the potential of the phase connection P owing to the closed switch K5. The capacitors C4 and C5 are now connected to the potential difference between P and P1 and constitute a voltage divider with the second power supply connection S2 connected to the center tap M thereof. The capacitance of the voltage divider consisting of capacitors C4 and C5 is then added to the capacitance of the motor capacitor CM. The capacitors C4 and C5 are preferably selected such that their values are smaller than the capacitance of motor capacitor CM by more than the factor of 10, preferably more than the factor of 100 so their influence is negligible. However, the current flowing through this voltage divider comprising capacitors C4 and C5 is still sufficient to operate the power supply unit 19. Capacitors C4 and C5 are preferably identical.

Hence in this third embodiment 30, the total potential difference between the phase connection P and potential P1 is not used to operate the power supply unit 19, but rather this is reduced again by the voltage divider comprising capacitors C4 and C5. Provision of this voltage divider is necessary when the contacts K4 and K5 are merely on/off switching contacts in order to avoid a shortcircuit between the first winding connection W1 and the second winding connection W2 and to allow a potential difference to develop between the power supply connections S1 and S2. The capacitors C4 and C5 are expediently of identical dimensions so as to obtain the same conditions in both running directions.

In the same way as in the first embodiment, when the switch-off device A1 is actuated, there is likewise an interruption in the supply of power to the power supply unit 19 immediately after closure of contact K5, which is likewise bridged by capacitor CS in the same way as in the first embodiment.

Figure 4:
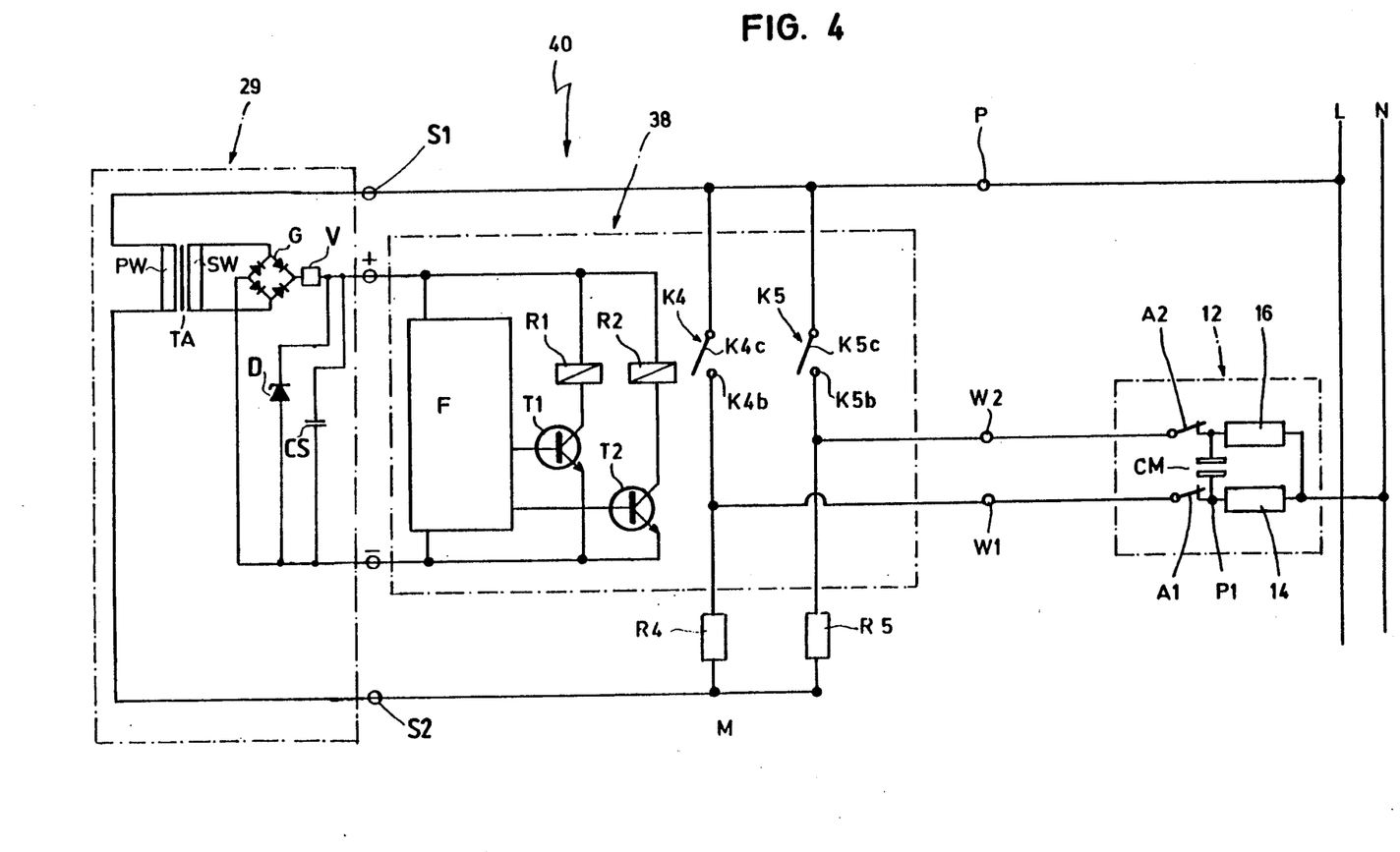
FIG. 4 a schematic diagram of a fourth embodiment of the invention similar to the second embodiment but utilizing single pole relays in the control unit.

In a fourth embodiment 40, illustrated in FIG. 4, insofar as the same parts are used as in the previous embodiments, the same reference numerals are used and, therefore, in connection with these parts reference is to be had to the previous statements.

In contrast with the third embodiment, the power supply valve 29 is of exactly the same design as in the second embodiment 20, while the control unit 38 is identical with that of the third embodiment.

In contrast with capacitors C4 and C5 in the third embodiment, ohmic resistors R4 and R5 are used in the fourth embodiment, but are likewise of such dimensions that a flow of current through the voltage divider formed by these resistors R4 and R5 is negligible in comparison with the flow of current through capacitor CM.

Otherwise, the fourth embodiment functions in exactly the same way as the third embodiment with the difference that the control unit 38 is free of potential owing to the transformer TA in the power supply unit 29.

Figure 5:
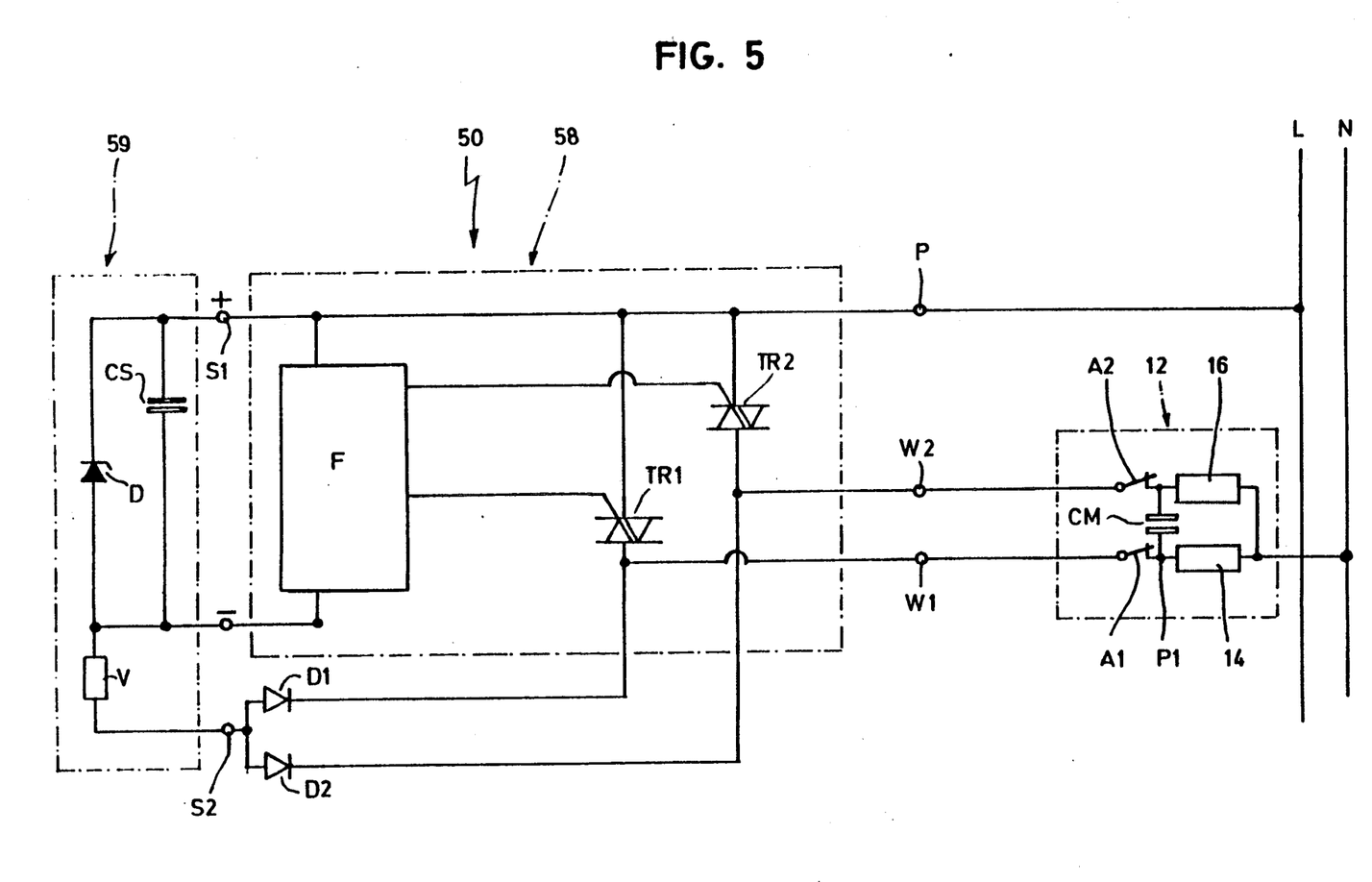
FIG. 5 a schematic diagram of a fifth embodiment of the invention in which a solid state control unit is provided.

In the fifth embodiment, designated in its entirety 50 and illustrated in FIG. 5, a control unit 58 differs from those of the previous embodiments in that it uses instead of relays R1 and R2 and their drivers T1 and T2, respectively, triacs TR1 and TR2 which are directly activated by the function control means F. The triacs TR1 and TR2 are connected, on the one hand, with the phase connection P and, on the other hand, with the first winding connection W1 and the second winding connection W2, respectively. As in the previous embodiments, the power supply connection S1 of a power supply unit 59 is connected to the potential of phase connection P, while the power supply connection S2 is connected via a diode D1 to the winding connection W1 and via a diode D2, poled in the same direction, to the winding connection W2.

The power supply unit 59 comprises a Zener diode D for voltage stabilization which is connected in series with a series resistor V between the first power supply connection S1 and the second power supply connection S2. At this voltage-stabilizing diode D, the positive and negative supply voltage can be tapped, this being additionally smoothed by a capacitor CS simultaneously serving as energy storage means for the start-up phase. The positive supply voltage + is present at the line leading to the mains connection P so the function control means F likewise taps it there, whereas the negative supply voltage − is supplied separately to the function control means F.

So long as neither of the triacs TR1 and TR2 has fired, these act as open switching contacts and, consequently, the second power supply connection S2 is connected to the neutral conductor either via the diode D1 and the winding connection W1 as well as the alternating-current motor 12 or via the diode D2, the winding connection W2 and the alternating-current motor 12. Proceeding from the state in which the switch-off device A1 is actuated and so in the state of rest of the control unit 58 both triacs TR1 and TR2 are in the blocking state, the second power supply connection S2 is connected via diode D2 to the neutral conductor and so by way of the phase connection P and the first power supply connection S1 a current can flow via the voltage-stabilizing diode D and the series resistor V and, consequently, in the case of a positive half-wave of the alternating voltage between L and N, the positive and negative supply voltage +, − is generated, whereas in the case of the negative halfwave the diode D2 is in the blocking state and the positive and negative supply voltage is maintained by capacitor CS.

After firing of the triac TR2 in the usual manner, the alternating-current motor starts up and so after a short time, the switch-off device A1 is no longer actuated and connects the first winding connection W1 to potential P1. Each time a positive half-wave is present, the diode D2 is in the blocking state, whereas the second power supply connection S2 is connected to potential P1 via diode D1 and so the potential difference between P and P1 is present at the power supply connections S1 and S2 of the power supply unit 59 and the positive and negative supply voltages +, − are generated.

In the case of a negative half-wave, on the other hand, diode D1 is in the blocking state and so the supply voltage +, − has to be generated by capacitor CS.

Figure 6:
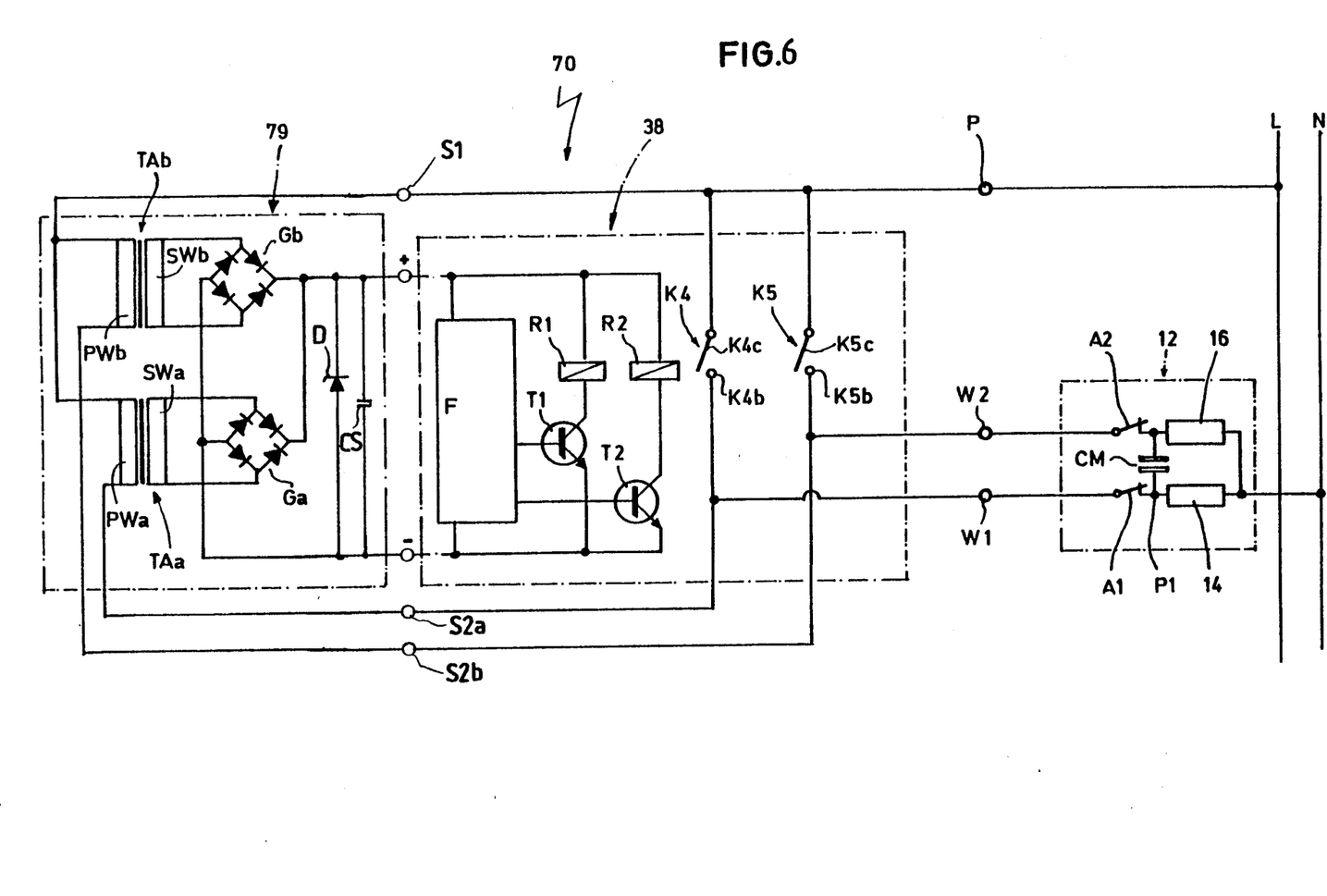
FIG. 6 a schematic diagram of a sixth embodiment of the invention in which a more sophisticated power supply is used.

A sixth embodiment, designated in its entirety 70 and illustrated in FIG. 6, bears the same reference numerals insofar as parts identical with those of the previous embodiments are used. Therefore, for a description of these, reference is to be had to the previous statements. In particular, the control unit 38 is identical with that of the third embodiment.

In contrast with the previous embodiments, a power supply unit 79 comprises two power supply connections S2a and S2b instead of one power supply connection S2. A primary winding PWa of a transformer TAa is located between the first power supply connection S1 and the second power supply connection S2a, while a primary winding PWb of a transformer TAb is located between the power supply connection S1 and the second power supply connection S2b.

Both transformers TAa and TAb serve to couple out electric energy and each comprise a secondary winding SWa and SWb, with each of these secondary windings SWa and SWb being connected on the input side to a rectifier Ga and Gb, respectively. Both rectifiers Ga and Gb are connected in parallel on the output side and deliver the necessary supply voltage +, − for the control unit 38.

The Zener diode D and the capacitor CS are likewise provided for stabilization of the supply voltage, as in the previous embodiments.

This seventh embodiment 70 operates in such a way that in the state of rest, at least via one primary winding PWa or PWb a current flows by way of the alternating-current motor 12 to the neutral conductor N and hence at least one of the transformers Ta or Tb couples out an alternating voltage via the secondary winding SWa or SWb which is rectified in the corresponding rectifier Ga or Gb. The fact that one of the transformers TAa or TAb is not operating when a limit switch A1 or A2 is actuated is of no significance so long as merely one of these is capable of coupling out energy.

In the switching state, that primary winding PWa or PWb which is connected to the winding connection W1 or W2 associated with the closed contact K1 or K2 is connected on both sides to phase connection P. Hence the respective transformer TAa or TAb delivers no supply voltage. On the other hand, a current flows through the primary winding PWb or PWa of the respective other transformer TAa and TAb as it is connected, on the one hand, with phase connection P and, on the other hand, with winding connection W2 or W1 which is associated with the open contact K2 or K1. Hence this transformer TAb or TAa in combination with the corresponding rectifier Gb or Ga is capable of delivering the necessary supply voltage +, − for the control unit 38.

I claim:

1. Control device for an alternating-current motor operating in single-phase and having at least a first and a second winding, one winding being coupled with the other winding such that the windings are shifted in phase with respect to each other when fed by a single-phase current comprising:

a line connection, a first and a second winding connection for said first and said second windings, respectively, of said alternating-current motor, a control unit including a first and a second switching element located between said line connection and said first and said second winding connections, respectively, one of said switching elements being in an open state and the other of said switching elements being in a closed state during a switching state of said control unit, depending on the running direction of said alternating-current motor, and at least one of said switching elements being open during a state of rest of said control unit, and a power supply for said control unit, wherein said power supply is powered during said state of rest of said control unit by a first potential difference between said line connection and a winding connection associated with said switching element open in said state of rest and wherein said power supply is powered during said switching state of said control unit by a second potential difference between said line connection and said winding connection associated with said switching element open in said switching state.

2. Control device as defined in claim 1, characterized in that in said state of rest of said control unit said first potential difference comprises the potential across said line connection and said winding connection associated with the switching element that was open during an immediately preceding switching state.

3. Control device as defined in claim 1, characterized in that in said state of rest said first potential difference comprises the potential across said line connection and both said first and said second winding connections.

4. Control device as defined in claim 1, characterized in that said power supply is connected by a first power supply connection with said line connection and by at least one second supply connection with said winding connection selected in accordance with said switching state or state of rest.

5. Control device as defined in claim 4, characterized in that said second power supply connection is connected with said selected winding connection during said state of rest and said switching state by at least one changeover element activated in accordance with the running direction of said alternating-current motor.

6. Control device as defined in claim 5, characterized in that at least one of said switching elements is designed as a changeover element and connects the winding connection associated therewith either with said line connection or with said second power supply connection.

7. Control device as defined in claim 4, characterized in that said second power supply connection is connected with each winding connection via a resistor.

8. Control device as defined in claim 4, characterized in that said second power supply connection is connected with each winding connection via a capacitor.

9. Control unit as defined in claim 4, characterized in that a primary winding of a transformer is located between said first and second power supply connections, and in that a secondary winding thereof is used to provide power to said control unit.

10. Control unit as defined in claim 1, characterized in that said power supply includes a rectifier.

11. Control unit as defined in claim 4, characterized in that said second power supply connection is connected with each winding connection via at least one diode.

12. Control device as defined in claim 1, characterized in that said power supply comprises two power supply connections each connected with a winding connection, and two transformers each having a primary winding located between said line connection and one of said power supply connections, and in that a secondary winding of each transformer is coupled with the respective other one thereof.

13. Control device as defined in claim 12, characterized in that each secondary winding is connected with an input of a rectifier and in that the outputs of said rectifiers are connected in parallel.

14. Control device as defined in claim 1, characterized in that said power supply unit comprises an electric energy storage means.

15. Control device as defined in claim 14, characterized in that said electric energy storage means is a capacitor.

16. Control device as defined in claim 1, characterized in that said switching elements comprise relays.

17. Control device as defined in claim 1, characterized in that said switching elements comprise triacs.

* * * * *